(12) United States Patent
Parsons et al.

(10) Patent No.: US 11,077,957 B2
(45) Date of Patent: Aug. 3, 2021

(54) SELECTABLE BARRIER FILTRATION SYSTEM

(71) Applicant: Bell Helicopter Textron Inc., Fort Worth, TX (US)

(72) Inventors: Thomas Dewey Parsons, Fort Worth, TX (US); David Haynes, Arlington, TX (US); David L. Miller, North Richland Hills, TX (US); Bradley Robert Henson, Mansfield, TX (US)

(73) Assignee: Textron Innovations Inc., Providence, RI (US)

( * ) Notice: Subject to any disclaimer, the term of this patent is extended or adjusted under 35 U.S.C. 154(b) by 354 days.

(21) Appl. No.: 15/878,075

(22) Filed: Jan. 23, 2018

(65) Prior Publication Data

US 2018/0208323 A1 Jul. 26, 2018

Related U.S. Application Data

(60) Provisional application No. 62/449,552, filed on Jan. 23, 2017.

(51) Int. Cl.
*B64D 33/02* (2006.01)
*F02C 7/055* (2006.01)

(52) U.S. Cl.
CPC .............. *B64D 33/02* (2013.01); *F02C 7/055* (2013.01); *B64D 2033/0246* (2013.01); *F05D 2220/323* (2013.01); *F05D 2220/90* (2013.01); *F05D 2260/606* (2013.01)

(58) Field of Classification Search
CPC ............ B64D 33/02; B64D 2033/0246; B64D 2033/022; F02C 7/055
See application file for complete search history.

(56) References Cited

U.S. PATENT DOCUMENTS

| | | | | |
|---|---|---|---|---|
| 3,016,109 A | * | 1/1962 | Howard, Jr. ........... | B64D 33/02 55/294 |
| 3,449,891 A | * | 6/1969 | Amelio ................ | F02M 35/16 55/306 |
| 3,483,676 A | * | 12/1969 | Sargisson ............... | B64D 33/02 55/306 |
| 4,397,431 A | * | 8/1983 | Ben-Porat ............. | B64D 33/02 244/53 B |

(Continued)

OTHER PUBLICATIONS

"Light, Cost and Resource Effective—Researching Sustainability of Direct Metal Laser Sintering (DMLS)", EADS Innovation Works, Filton, Bristol (UK), Jul. 2013, 4 pages.

(Continued)

*Primary Examiner* — Richard R. Green
*Assistant Examiner* — William L Gmoser
(74) *Attorney, Agent, or Firm* — Lightfoot & Alford PLLC

(57) ABSTRACT

An air intake system (AIS) has a plenum and an inlet barrier filter associated with the plenum, through which air can selectively enter the plenum. The AIS also has an inlet duct associated with the plenum, through which air can selectively enter the plenum. The AIS also has a bypass door associated with the inlet duct, the bypass door being configured to selectively change an amount of air allowed to pass through the inlet duct. The AIS also has a filter airflow change device configured to change an amount of airflow allowed through the inlet barrier filter.

14 Claims, 9 Drawing Sheets

(56) References Cited

U.S. PATENT DOCUMENTS

| | | | | |
|---|---|---|---|---|
| 5,865,398 A * | 2/1999 | Pashea | ............. | B64D 33/02 244/53 B |
| 8,096,499 B2 * | 1/2012 | Osswald | ............. | F02C 7/052 244/17.11 |
| 2002/0182062 A1 * | 12/2002 | Scimone | ............. | B64D 33/02 415/121.2 |
| 2005/0229558 A1 * | 10/2005 | Stelzer | ............. | B01D 46/0005 55/385.3 |
| 2007/0025838 A1 * | 2/2007 | Stelzer | ............. | B64D 33/02 415/121.2 |
| 2008/0296439 A1 * | 12/2008 | Cloft | ............. | B64D 33/02 244/208 |
| 2010/0266424 A1 * | 10/2010 | Renz | ............. | F04F 5/463 417/191 |
| 2011/0001003 A1 * | 1/2011 | Krahl | ............. | B01D 46/0035 244/58 |
| 2011/0136425 A1 * | 6/2011 | Eichholz | ............. | B64C 7/00 454/76 |
| 2011/0265650 A1 * | 11/2011 | Kazlauskas | ............. | B64D 33/02 95/269 |
| 2012/0111011 A1 * | 5/2012 | Pike | ............. | F02C 7/04 60/722 |
| 2014/0077039 A1 * | 3/2014 | Scimone | ............. | B64C 27/28 244/23 B |
| 2014/0158833 A1 * | 6/2014 | Braeutigam | ............. | B64D 33/02 244/53 B |
| 2015/0219010 A1 * | 8/2015 | Santini | ............. | F01D 25/002 60/39.092 |
| 2016/0075439 A1 * | 3/2016 | Mores | ............. | B64D 33/02 244/53 B |
| 2016/0245152 A1 * | 8/2016 | Thomassin | ............. | F02B 29/0412 |
| 2018/0066591 A1 * | 3/2018 | Ozzello | ............. | F02C 9/263 |
| 2018/0093779 A1 * | 4/2018 | Ainslie | ............. | B64D 41/00 |
| 2018/0106225 A1 * | 4/2018 | Dionne | ............. | F02B 53/14 |

OTHER PUBLICATIONS

"Certified for Universal Success: Additive Manufacturing of Satellite Components", RUAG, Jul. 2016, 4 pages.

* cited by examiner

SELECTABLE BARRIER FILTRATION SYSTEM

CROSS-REFERENCE TO RELATED APPLICATIONS

This patent application claims the benefit of the filing date of the U.S. Provisional Patent Application Ser. No. 62/449,552, filed on 23 Jan. 2017 and entitled "Selectable Barrier Filtration System," the entire content of which is hereby expressly incorporated by reference.

BACKGROUND

Some vehicles, such as, but not limited to, tiltrotor aircraft comprise air inlet barrier filters configured to reduce particulate matter fed to an engine compressor intake. In some cases, providing the inlet barrier filter can reduce efficiency and/or power of an engine as a function of air escaping out through the air inlet barrier filters and/or as a function of associated ducting geometry that impedes efficient airflow to the engine compressor intake. In some aircraft, air may be forced out of the aircraft through an inlet barrier filter and such reverse flow through filters can result in spillage drag. Spillage drag can reduce overall aircraft performed, in the least, by reducing a maximum airspeed of the aircraft.

BRIEF DESCRIPTION OF THE DRAWINGS

Prior Art

Prior Art

DETAILED DESCRIPTION

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
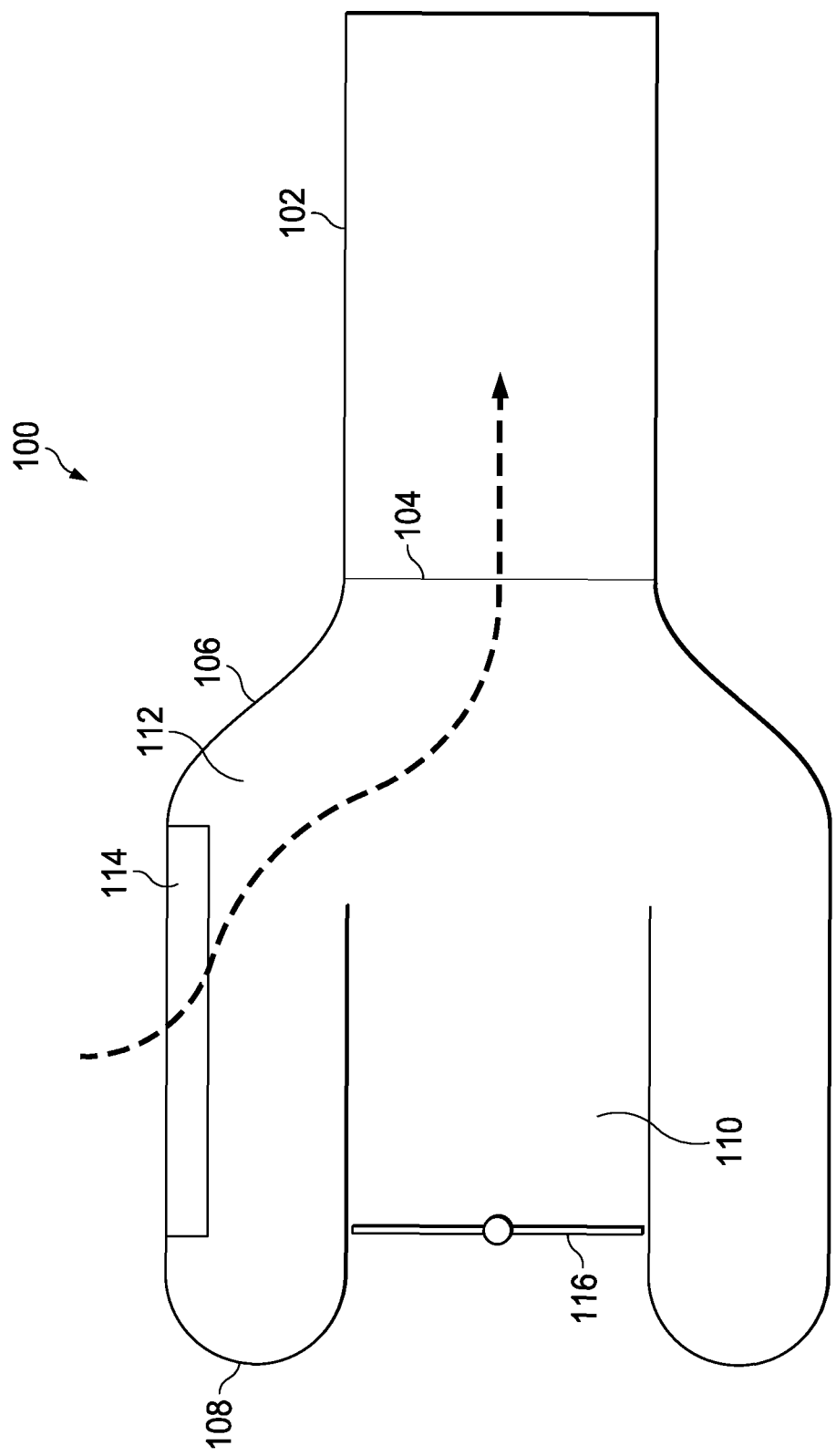
FIG. 1 is a schematic view of a prior art air intake system with a closed bypass door.
Figure 2:
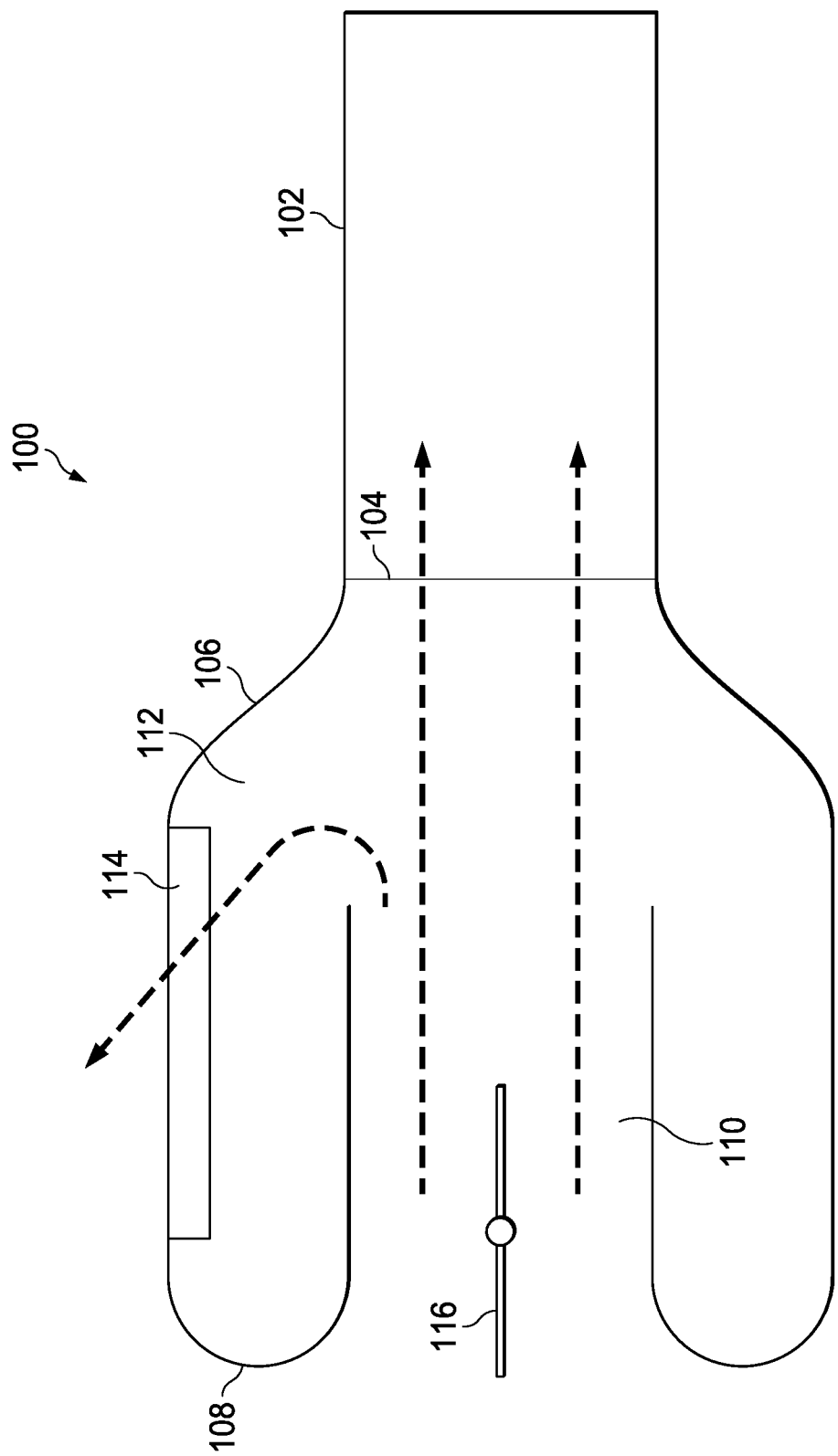
FIG. 2 is a schematic view of the prior art air intake system of Prior Art FIG. 1 with an open bypass door.

Referring to Prior Art FIG. 1 and Prior Art FIG. 2 in the drawings, an air intake system (AIS) 100 is illustrated. In Prior Art FIG. 1, AIS 100 is shown as comprising an engine 102 comprising an engine compressor intake 104, a cowling and/or fairing 106, an inlet duct 108 comprising a throat 110, a plenum 112, and an inlet barrier filter 114. AIS 100 further comprises a bypass door 116. Prior Art FIG. 1 shows the bypass door 116 in a closed position which forces AIS 100 to draw air into the plenum 112 though the inlet barrier filter 114. Prior Art FIG. 2 shows the AIS 100 with the bypass door 116 in an open position. With the bypass door 116 in the open position air can enter the inlet duct 108 and pass through the plenum 112 to the engine compressor intake 104. However, the pressure at which the air is introduced to the engine compressor intake 104 may be reduced because of air flowing out of the plenum 112 though the inlet barrier filter 114 and/or as a function of the geometry of the inlet duct 108 relative to the plenum 112. Further, AIS 100 may also reduce an overall efficiency of the aircraft by allowing air to backflow through the inlet barrier filter 114 which can result in spillage drag.

Figure 3:
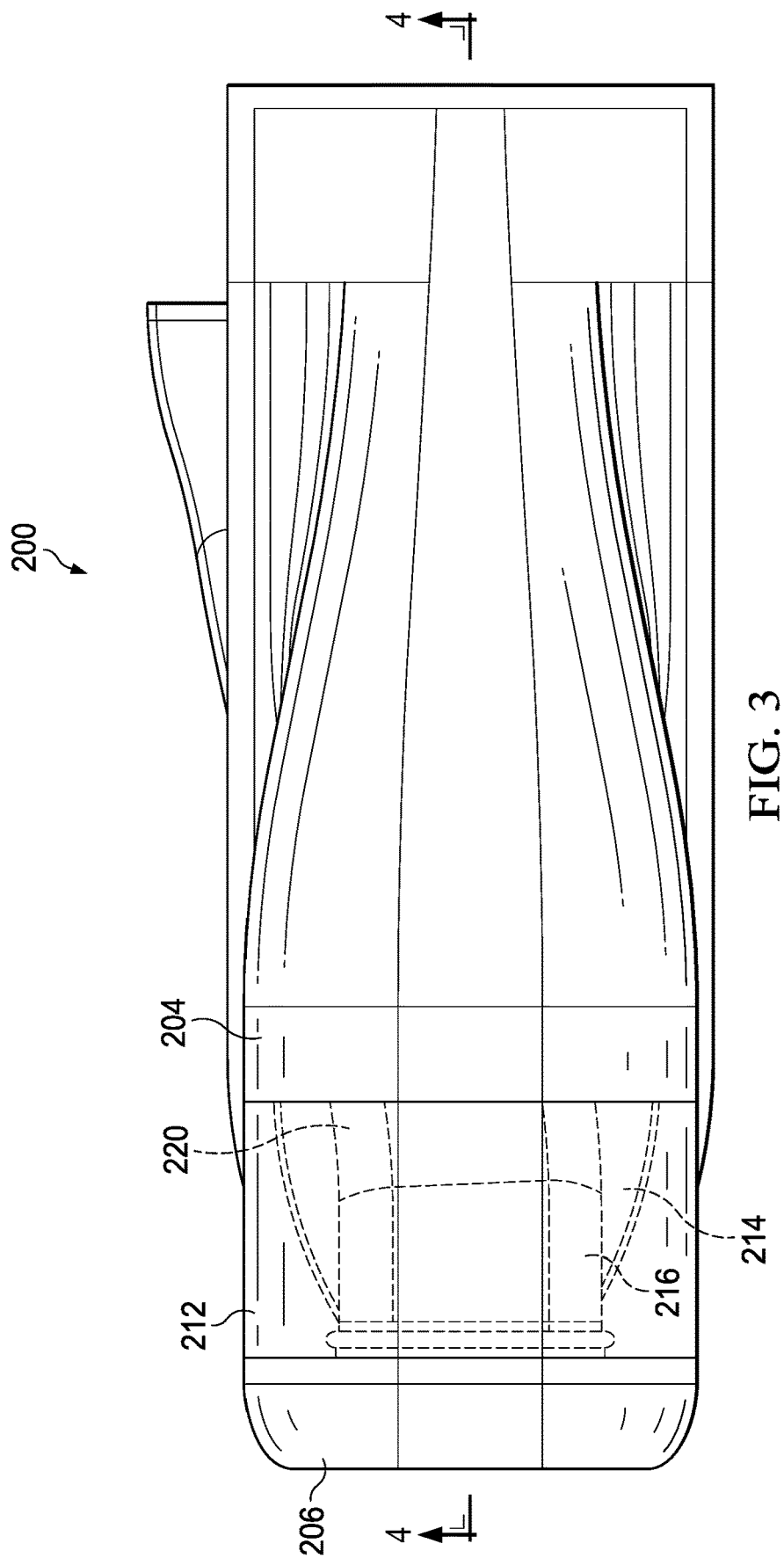
FIG. 3 is a top view of an air intake system (AIS) according to an embodiment of the disclosure.
Figure 4:
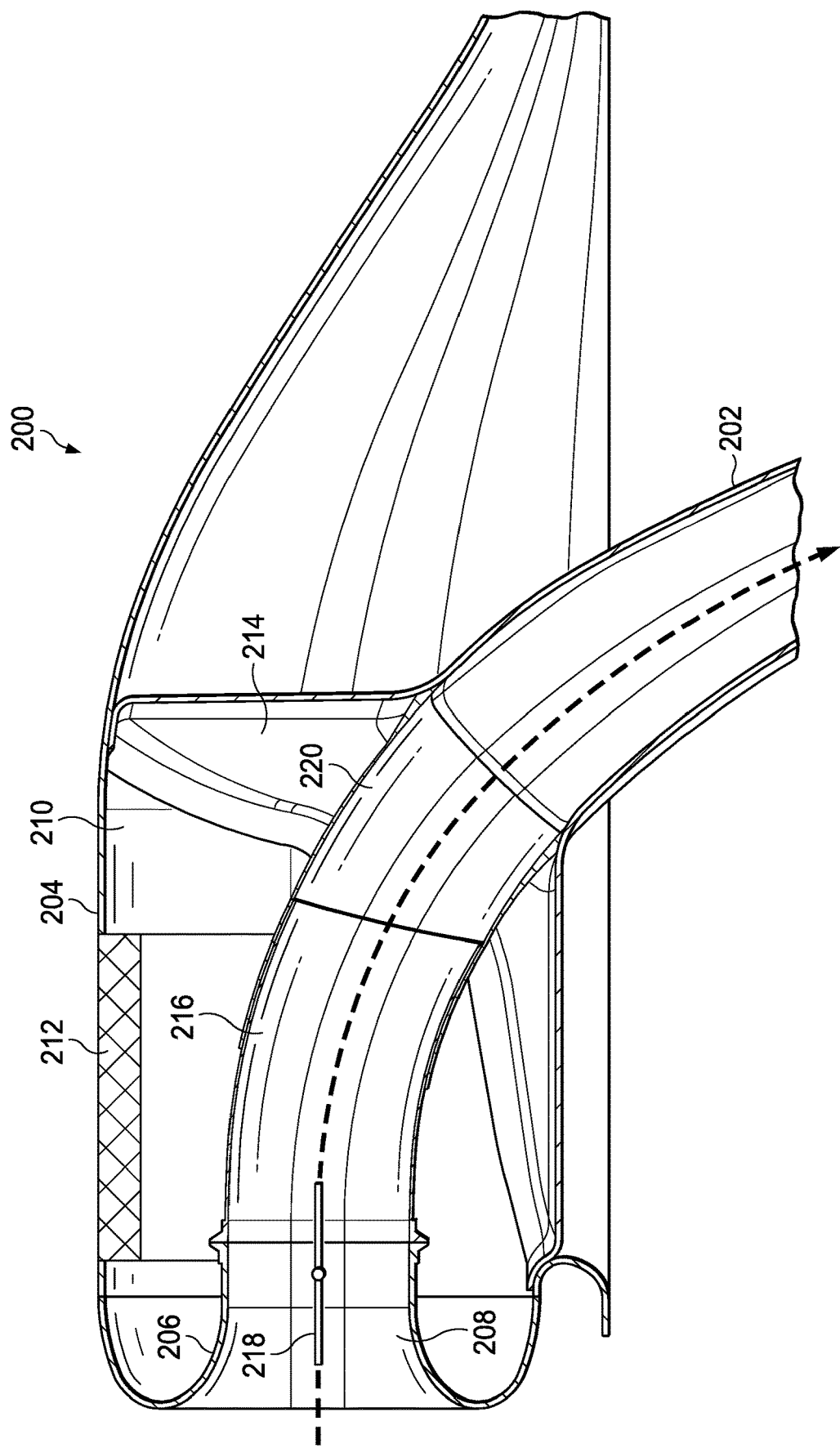
FIG. 4 is a cutaway view of the AIS of FIG. 3, with an open bypass door and a closed filter bypass valve.
Figure 5:
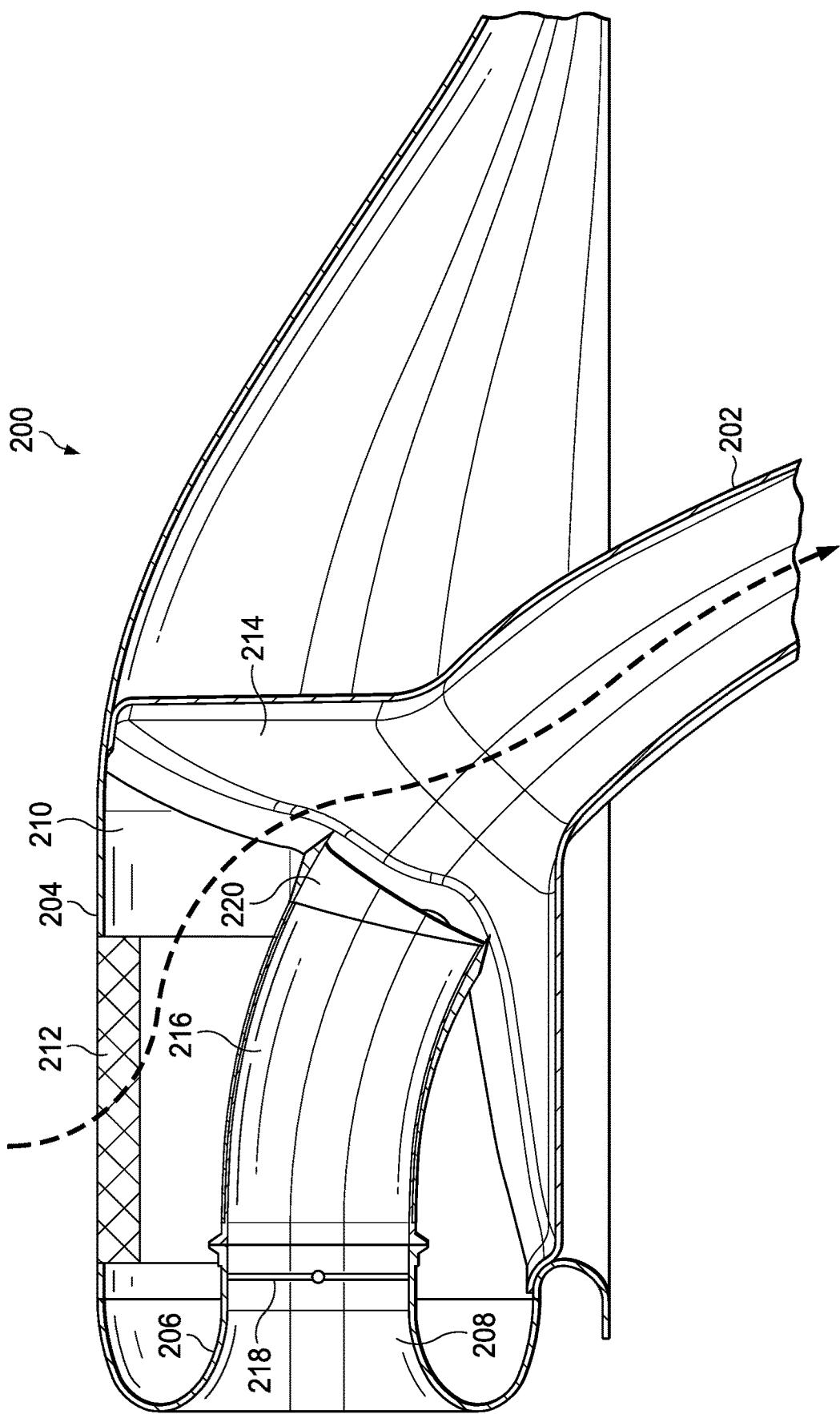
FIG. 5 is a cutaway view of the AIS of FIG. 3, with a closed bypass door and an open filter bypass valve.

FIGS. 3-5 illustrate an air intake system (AIS) 200 comprising an engine intake duct 202, a cowling and/or fairing 204, an inlet duct 206 comprising a throat 208, a plenum 210, an inlet barrier filter 212, a filter plenum barrier 214, a carrier duct 216 connected to the inlet duct 206, a bypass door 218 disposed within the throat 208, and a slide valve 220 carried by the carrier duct 216. FIG. 3 shows a top view of the AIS 200. FIG. 4 shows a cutaway view of the AIS 200 taken along the cutting line of FIG. 3 with the bypass door 218 open and the slide valve 220 closed. FIG. 5 shows a cutaway view of the AIS 200 taken along the cutting line of FIG. 3 with the bypass door 218 closed and the slide valve 220 open.

As configured in FIG. 4, the AIS 200 can maximize engine and/or aircraft performance by providing an increased airflow pressure to the engine intake duct 202 while also minimizing spillage drag. In this embodiment, this is provided by sliding the slide valve 220 along the carrier duct 216 toward the engine intake duct 202 until the slide valve 220 is substantially in contact with the engine intake duct 202. With the slide valve 220 in the depicted closed position, the AIS 200 generally provides a direct airflow path from the inlet duct 206 to the engine intake duct 202 through the carrier duct 216 and the slide valve 220. Accordingly, there is no opportunity for air to enter through the inlet duct 206 and exit through the inlet barrier filter 212. In some cases, the configuration shown in FIG. 4 may be suitable for use when the aircraft is in a forward flight mode, airplane mode, and/or any other mode of operation when airflow and/or air pressure to the engine intake duct 202 is desired to be relatively high or at a maximum and/or when spillage drag needs to be minimized.

As configured in FIG. 5, the AIS 200 can filter particulate matter from incoming air. In this embodiment, this is provided by sliding the slide valve 220 along the carrier duct 216 toward the inlet duct 206 so that an end of the slide valve 220 is generally open to the plenum 210. With the slide valve 220 in the depicted open position, the AIS 200 generally provides an airflow path from the inlet barrier filter 212 to the engine intake duct 202 through plenum 210. Although the airflow pressure provided to the engine intake duct 202 may be reduced relative to the configuration shown in FIG. 4, the AIS 200 can successfully filter incoming air. In some cases, the configuration shown in FIG. 5 may be suitable for use when the aircraft is in a hover mode, in an environment with undesirable particulate matter in the incoming air, or any other mode or environment where filtering air provided to the engine intake duct 202 is desired.

Figure 6:
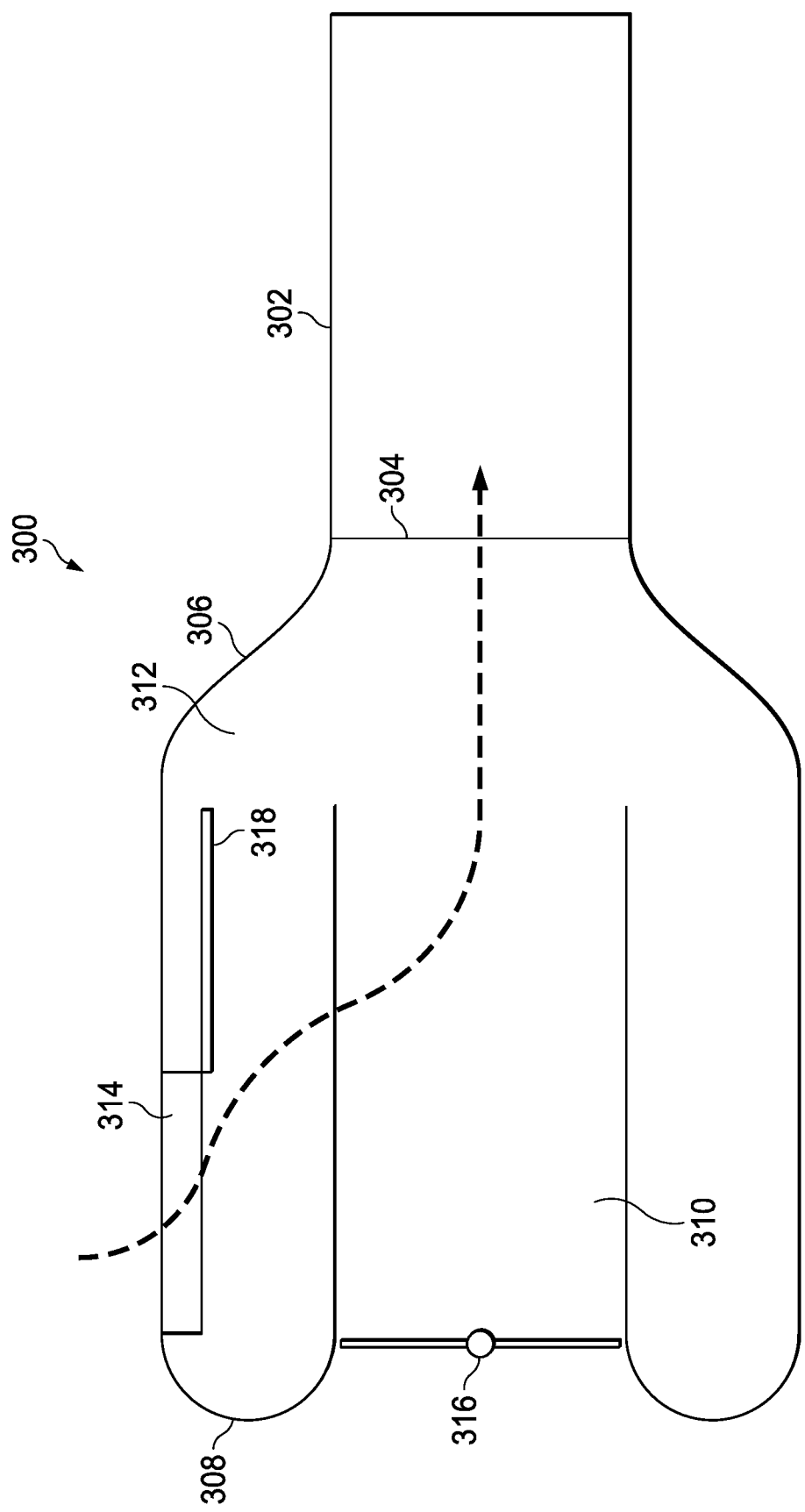
FIG. 6 is a schematic view of another embodiment of an AIS according to the disclosure, with a closed bypass door and an open filter door.
Figure 7:
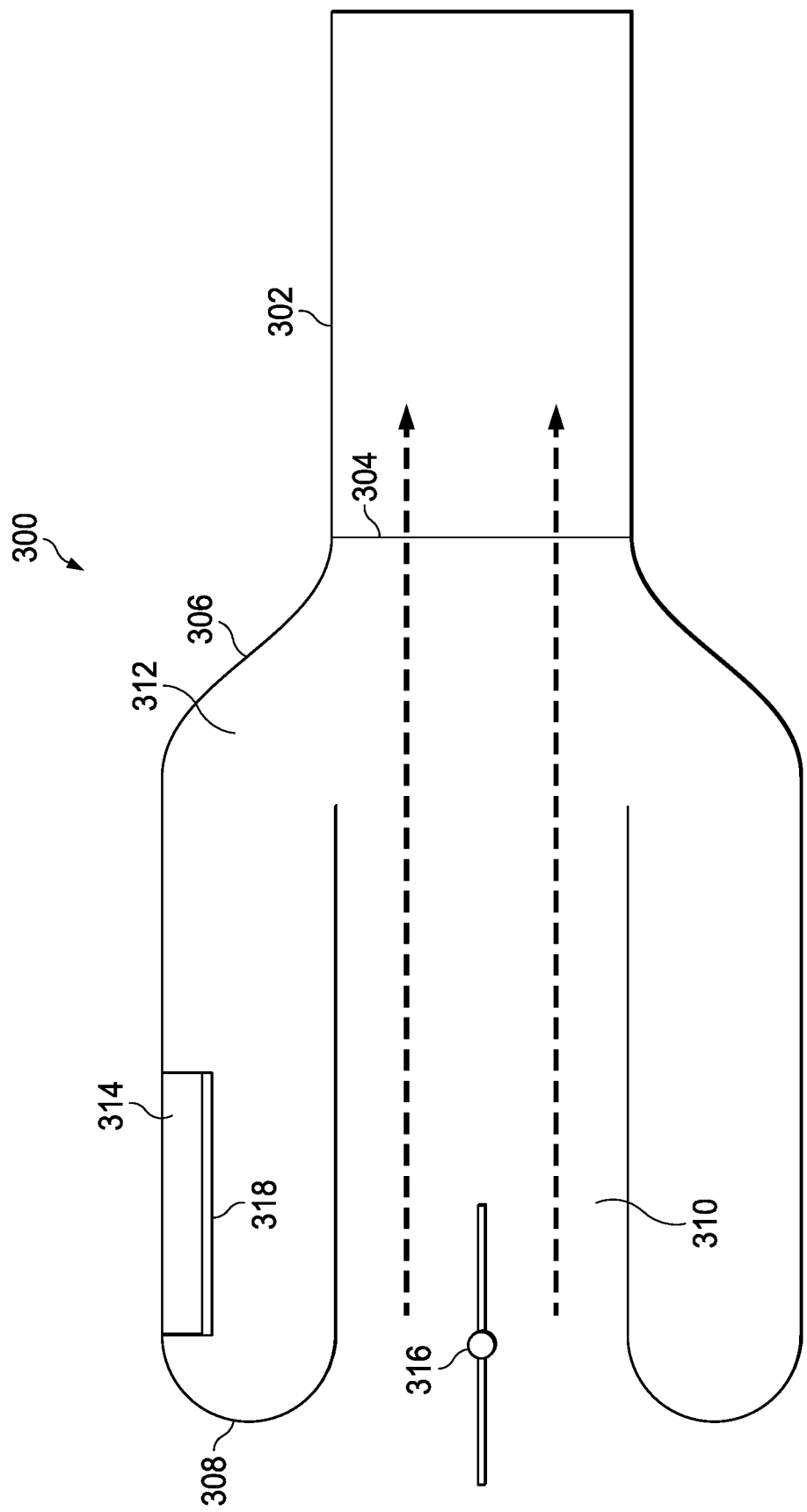
FIG. 7 is a schematic view of the AIS according to FIG. 6, with an open bypass door and a closed filter door.

Referring to FIGS. 6 and 7 in the drawings, an air intake system (AIS) 300 is illustrated. In FIG. 6, AIS 300 is shown as comprising an engine 302 comprising an engine compressor intake 304, a cowling and/or fairing 306, an inlet duct 308 comprising a throat 310, a plenum 312, and an inlet barrier filter 314. AIS 300 further comprises a bypass door 316 and a movable filter door 318. FIG. 6 shows the bypass door 316 in a closed position and with the filter door 318 in an open position which forces AIS 300 to draw air into the plenum 312 though the inlet barrier filter 314. FIG. 7 shows the AIS 300 with the bypass door 316 in an open position and the filter door 318 in a closed position which allows air to more directly pass from the inlet duct 308, through the plenum 312, and to the engine compressor intake 304. As compared to the configuration of Prior Art FIG. 2, the pressure at which the air is introduced to the engine compressor intake 104 may be higher because the closed filter door 318 prevents air from escaping the plenum 112 though the inlet barrier filter 114.

Figure 8:
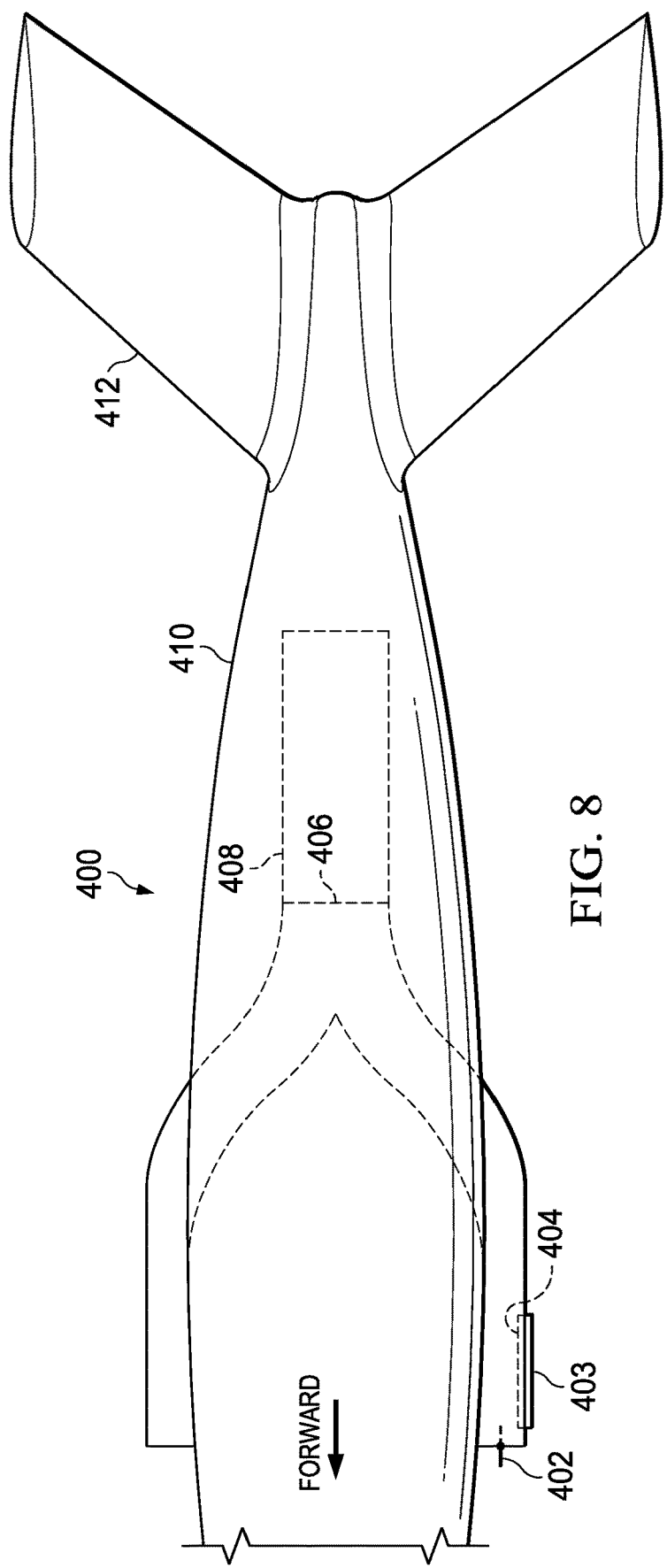
FIG. 8 is a schematic view of another embodiment of an AIS according to the disclosure, with an open bypass door and a closed filter door.
Figure 9:
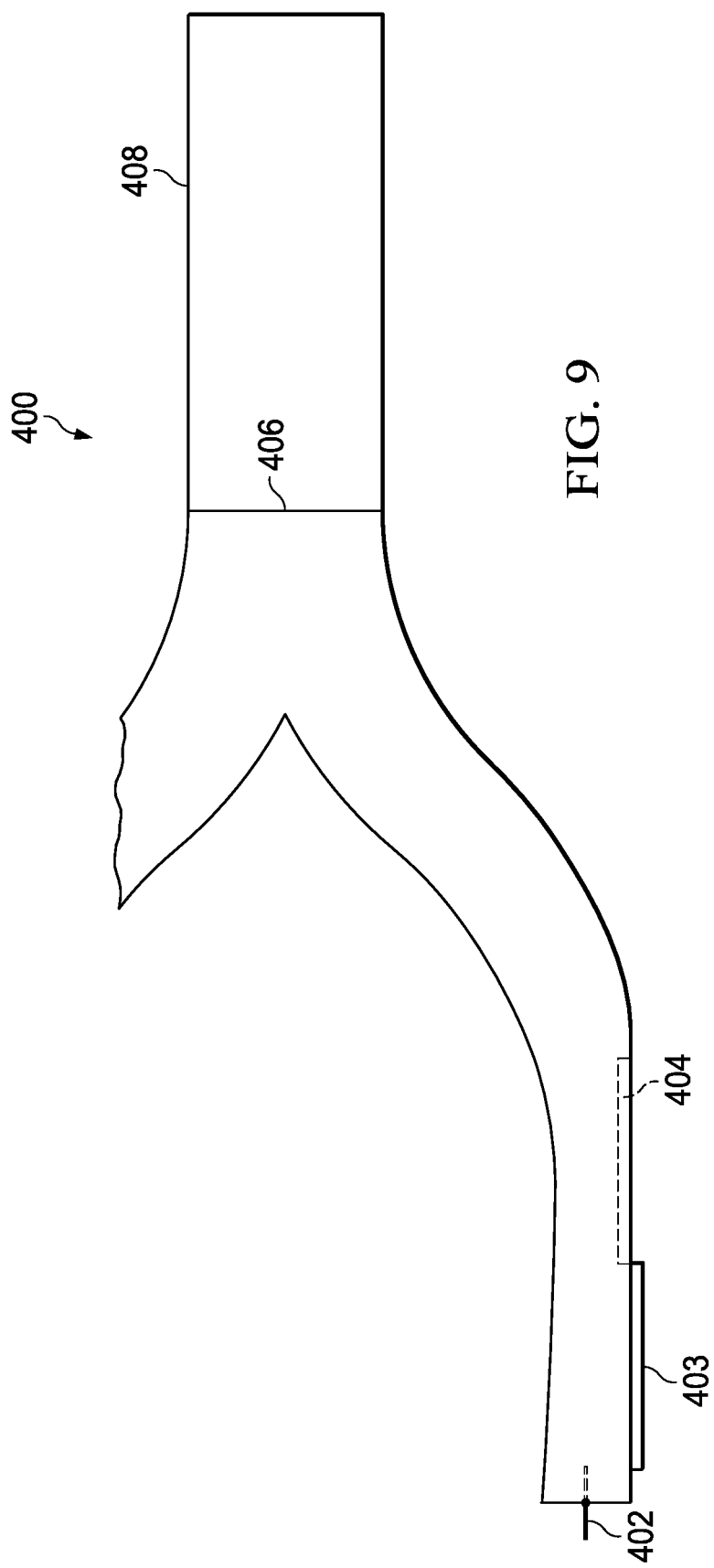
FIG. 9 is a schematic view of the AIS according to FIG. 8, with an open bypass door and an open filter door.

Referring to FIGS. 8 and 9, an air intake system (AIS) 400 is shown. FIG. 8 shows AIS 400 which comprises an inlet barrier filter 403 configured with an open bypass door 402 and a closed filter door 404. FIG. 9 shows AIS 400 configured with an open bypass door 402 and an open filter door 404. In this embodiment, the AIS 400 is configured to feed air to an engine compressor intake 406 of an engine 408. In this embodiment, the engine 408 is embedded in an airframe 410 forward of a tail 412.

In one or more of the embodiments above (excluding AIS 100), the ability to select whether air passes through an inlet barrier filter during cruise or other conditions where filtered air is not needed can provide a smooth airflow path to the engine and prevent backflow of air through the inlet barrier filter while maintaining a desired ram pressure recovery for maximum fuel efficiency in a cruise or airplane mode of operation of a tiltrotor aircraft. The above-mentioned prevention of air backflowing through the inlet barrier filter 314 reduces spillage drag and reduces overall aircraft drag so that an increased overall efficiency of the aircraft and/or higher maximum airspeeds can be obtained. Some components of the embodiments disclosed above can be manufactured utilizing direct laser sintered metal which provides thin section metallic components. In particular, one or more of the carrier duct 216 and the slide valve 220 can be created using direct laser sintered metal. In alternative embodiments, one or more of the components of the AISs disclosed herein may be manufactured using any other additive manufacturing process besides direct laser sintered metal. In some embodiments, movement of the filter doors and/or slide valves can be accomplished using linear actuators and/or any other suitable means for generating relative movement between the filter door and the inlet barrier filter and the slide valve and the carrier duct, respectively.

When the AISs 200, 300, 400 are utilized in a tiltrotor aircraft, such as, but not limited to, a Bell Helicopter V-280 and/or a Bell-BoeingV-22, engine performance can be increased in high speed, cruise, and/or airplane modes of operation due at least in part to an increased ram air pressure being fed to the engine and/or engine compressor intake. In some cases, the increased ram air pressure can increase an amount of available engine power. Additionally, the AISs 200, 300, 400 can increase overall aircraft performance by reducing spillage drag. In some cases, the engines disclosed herein may comprise turboprop engines or turbine engines. The systems and methods disclosed herein can be utilized with aircraft having an engine embedded centrally within a fuselage, an engine mounted on top of an airframe, an engine mounted on a tip of a wing, and/or other suitable engine locations. When in hover mode, a tiltrotor aircraft may need an increased mass flow rate of air intake as compared to when operating in an airplane mode. Accordingly, a large amount of inlet barrier filter surface area may be desired for hover mode. The systems and methods disclosed herein allow the provision of a large filter surface area without the large surface area degrading the airplane mode operation because the filter surface area is effectively reduced by covering the filter with the filter door and/or the filter is effectively eliminated from the airflow path altogether utilizing the movable slide valve.

Additionally, some embodiments disclosed herein can reduce opportunities for foreign object damage to the AISs since, for example, closing the slide valve can reduce the number of components and parts exposed to air introduced into the AISs. In some cases, by preventing air outflow through the filters, overall aircraft drag is reduced while maintaining a desired inlet ram air recovery thereby maximizing engine performance. In some embodiments, the AISs can be operated in generally two modes, an airplane mode in which ram air is unfiltered and the filter is blocked off to prevent outflow of air through the filter and a helicopter mode where air is primarily provided to the engine through the filter.

In some embodiment, actuation and/or movement of the slide valve and/or the filter door can be at least partially controlled automatically as a function of a flight control computer that controls changing a tiltrotor from a helicopter mode of operation to an airplane or cruise mode of operation. In some embodiments, a manual override can be provided to allow a user to force the opening and/or closing of one or more of the bypass door, the slide valve, and/or the filter door. The slide valve/carrier duct combination and the filter doors disclosed herein can each alternatively be referred to as filter airflow change devices since movement of the slide valve and/or filter doors affects an amount of air allowed to move through the inlet barrier filters.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. An air intake system (AIS), comprising:
   a plenum;
   an inlet barrier filter associated with the plenum, through which air can selectively enter the plenum;
   an inlet duct associated with the plenum, through which air can selectively enter the plenum;
   a bypass door associated with the inlet duct, the bypass door being configured to selectively change an amount of air allowed to pass through the inlet duct; and
   a filter airflow change device configured to change an amount of airflow allowed through the inlet barrier filter;
   wherein the filter airflow change device comprises a tubular slide valve and a carrier duct and wherein the slide valve is configured to receive at least a portion of a tubular portion of the carrier duct;
   wherein when the tubular slide valve is fully extended relative to the carrier duct, airflow from the inlet duct to an engine intake duct via the inlet barrier filter is substantially reduced and airflow to the engine intake duct via the inlet duct is substantially increased; and
   wherein movement of the tubular slide valve relative to the carrier duct changes an amount of longitudinal overlap between the tubular slide valve and the carrier duct.

2. The AIS of claim 1, wherein the filter airflow change device is movable relative to the inlet barrier filter.

3. The AIS of claim 2, wherein the filter airflow change device is a filter door.

4. The AIS of claim 3, wherein the filter door is configured to slide relative to the inlet barrier filter.

5. The AIS of claim 1, wherein the tubular slide valve is movable along a curved path to selectively provide a closed airflow path from the inlet duct to the engine intake duct.

6. An aircraft, comprising:
   an engine comprising an engine compressor intake;
   a plenum;
   an inlet barrier filter associated with the plenum, through which air can selectively enter the plenum;
   an inlet duct associated with the plenum, through which air can selectively enter the plenum;
   a bypass door associated with the inlet duct, the bypass door being configured to selectively change an amount of air allowed to pass through the inlet duct and to the engine compressor intake; and
   a filter airflow change device configured to change an amount of airflow allowed through the inlet barrier filter and to the engine compressor intake;
   wherein the filter airflow change device comprises a tubular slide valve and a carrier duct and wherein the slide valve is configured to receive at least a portion of a tubular portion of the carrier duct;
   wherein when the tubular slide valve is fully extended relative to the carrier duct, airflow from the inlet duct to an engine intake duct via the inlet barrier filter is substantially reduced and airflow to the engine intake duct via the inlet duct is substantially increased; and
   wherein movement of the tubular slide valve relative to the carrier duct changes an amount of longitudinal overlap between the tubular slide valve and the carrier duct.

7. The aircraft of claim 6, wherein the filter airflow change device is movable relative to the inlet barrier filter.

8. The aircraft of claim 7, wherein the filter airflow change device is a filter door.

9. The aircraft of claim 8, wherein the filter door is configured to slide relative to the inlet barrier filter.

10. The aircraft of claim 6, wherein the tubular slide valve is movable along a curved path to selectively provide a closed airflow path from the inlet duct to an engine intake duct.

11. A method of operating an aircraft, comprising:
    selectively providing a first airflow path between an inlet duct and an engine compressor intake;
    selectively providing a second airflow path between an inlet barrier filter and the engine compressor intake; and
    operating a filter airflow change device configured to change an amount of airflow allowed through the inlet barrier filter;
    wherein the filter airflow change device comprises a tubular slide valve and a carrier duct and wherein operating the slide valve comprises changing an amount of a tubular portion of the carrier duct received within the slide valve;
    fully extending the tubular slide valve relative to the carrier duct so that airflow from the inlet duct to an engine intake duct via the inlet barrier filter is substantially reduced and airflow to the engine intake duct via the inlet duct is substantially increased; and
    wherein movement of the tubular slide valve relative to the carrier duct changes an amount of longitudinal overlap between the tubular slide valve and the carrier duct.

12. The method of claim 11, further comprising:
    reducing airflow through the first airflow path and increasing airflow through the second airflow path.

13. The method of claim 11, further comprising:
    increasing airflow through the first airflow path and reducing airflow through the second airflow path.

14. The method of claim 11, further comprising:
    moving the tubular slide valve along a curved path.

* * * * *